Patented Apr. 3, 1945

2,372,654

UNITED STATES PATENT OFFICE 2,372,654

MANUFACTURE OF SUBSTANCES PROMOTING THE GROWTH OF YEAST AND OTHER UNICELLULAR PLANTS

Franz Bergel, Alexander Lang Morrison, Nathan Chadwick Hindley, and Albert Ronald Moss, Welwyn Garden City, England, assignors to Roche Products Limited, Welwyn Garden City, England No Drawing. Application September 2, 1942, Serial No. 457,080. In Great Britain September 17, 1941

4 Claims. (Cl. 260—561)

This invention relates to the manufacture of substances promoting the growth of yeast and other unicellular plants. It is known from the literature that substances such as pantothenic acid are constituents of "bios" and promote the growth not only of yeast but also of other unicellular plants, e. g. *Lactobacillus casei*.

For the manufacture of the yeast-growth promoting substance, pantothenic acid, which is represented by the following formula:

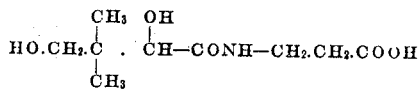

α-hydroxy-β:β-dimethyl-γ-butyrolactone is usually condensed with an ester of β-alanine or a salt of β-alanine (cf. E. Stiller and others, J. Am. C. S., 1940, 62, 1785; R. J. Williams and others, J. Am. C. S., 1940, 62, 1784; T. Reichstein and A. Grüssner, Helv. Chim. Acta, 1940, 23, 650).

We have now found that when α-hydroxy-β:β-dimethyl-γ-butyrolactone is condensed with an acetal of β-aminopropionaldehyde, the resulting compound mildly hydrolysed by known methods and one of the products remaining in aqueous solution oxidised with hydrogen peroxide, at least three substances of yeast-growth promoting properties are formed at various stages of these reactions.

If, for example, equimolecular quantities of α-hydroxy-β:β-dimethyl-γ-butyrolactone and β-aminopropionaldehyde-diethyl-acetal are heated together in alcohol solution, the product formed is found to distil at 175–185° C./0.05–0.1 mm. and analyses correctly for the expected acetal of the following constitution:

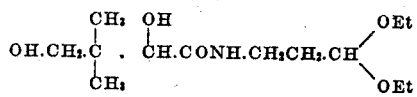

This substance when tested with an English Brewery top fermentation yeast shows a moderate growth promoting action.

It is not necessary for the following operation to purify this acetal by distillation.

When the acetal is hydrolysed under mild acidic conditions such as are generally employed for the hydrolysis of acetals, for example, with aqueous oxalic acid solution, a water-soluble aldehyde is produced together with a crystalline solid, sparingly soluble in water, having constant melting point 271° C., a molecular weight of approximately 300, and exhibiting a yeast-growth promoting action.

The water-soluble main product of aldehydic nature after removal of oxalic acid with calcium carbonate is not isolated, but directly oxidised with hydrogen peroxide in the presence of calcium hydroxide to give a solid product which, according to tests for yeast-growth promoting action and chemical analysis, consists essentially of the calcium salt of pantothenic acid. If hydrolysis is carried out with oxalic acid simultaneously with oxidation by hydrogen peroxide, the high-melting substance is not formed, but from the solution calcium pantothenate can be isolated by treatment with calcium carbonate. When the process is carried out with optically active d(—) α - hydroxy - β:β - dimethyl - γ - butyrolactone as starting material, optically active d(+)-pantothenic aldehyde acetal is obtained, which can be hydrolysed and oxidised to d(+)-pantothenic acid.

The following examples illustrate how the process of the invention may be carried into effect.

1. 5.3 parts by weight of α-hydroxy-β:β-dimethyl-γ-butyrolactone and 6 parts by weight of β-aminopropionaldehyde-diethyl-acetal are dissolved in 35 parts by volume of methyl alcohol and the solution heated at the boiling point for one hour. After distilling off the methyl alcohol the residual oil is distilled at 0.05–0.1 mm., when it comes over at 175–185° C., and analyses correctly for the expected pantothenic aldehyde-diethyl acetal.

When 0.00005 gm. of the above substance is added to 50 ccs. of a synthetic culture medium containing in addition an English Brewery top fermentation yeast and 0.001 gm. of inositol, and the culture incubated at 26° C., for a period of 48 hours, it was found that yeast growth as determined by cell count and developed acidity was greater than the yeast growth in an identical medium with no addition of pantothenic aldehyde-diethyl-acetal.

3 parts by weight of pantothenic aldehyde-diethyl-acetal are dissolved along with 1.7 parts by weight of oxalic acid in 20 parts by weight of water and the solution is left in an atmosphere of nitrogen for 3 days at 15–25° C. During this period a certain amount of a crystalline material separates out. It is filtered off and recrystallised from ethyl alcohol when it has a constant melting point of 271° C. Analysis of this substance shows that it contains 58.7% of carbon, 8.3% of hydrogen and 8% of nitrogen and possesses a molecular weight of about 300.

When tested for yeast-growth promoting properties, as described in the case of pantothenic aldehyde-diethyl-acetal, this compound, melting point 271° C. causes an increase of yeast-growth.

The solution left after removal of substance melting point 271° C. is shaken with 3 parts by weight of calcium carbonate powder, and the mixture of calcium oxalate and excess calcium carbonate filtered off. To the filtrate, which possesses aldehydic properties, 1 part by weight of calcium hydroxide and 2 parts by volume of 30% hydrogen peroxide solution are added and the mixture shaken at 15–25° C. for 16 hours. Insoluble material is then filtered off and the filtrate concentrated to dryness. 1 part by weight of the dry solid left is dissolved in 15 parts by volume of absolute ethyl alcohol and then poured into 40 parts by volume of dry ether. The solid precipitated is filtered off and consists essentially of the calcium salt of dl-pantothenic acid.

When tested for yeast-growth promoting properties as described above this calcium salt causes an increase of yeast growth.

2. 10 parts by weight of pantothenic aldehyde-diethylacetal prepared as described in Example 1 but are not distilled and 5 parts by weight of crystalline oxalic acid are dissolved in 70 parts by volume of water and 10 parts by volume of 30% hydrogen peroxide are added. This mixture is kept at room temperature for two days. 6 parts by weight of calcium carbonate powder are then added and the suspension shaken for four days. The solid is then filtered off and the filtrate evaporated in vacuo, the temperature being kept below 50° C. The residual colourless viscous oil is dissolved in 20 parts by volume of methanol and the solution poured into 400 parts by volume of dry acetone. A fluffy white precipitate of a calcium salt is immediately produced. Analysis indicates that it consists essentially of calcium pantothenate. This substance has pronounced growth promoting properties towards *Lactobacillus casei*.

3. 3 parts by weight of d(—)α-hydroxy-β:β-dimethyl-γ-butyrolactone ($[\alpha]_D^{23} = -50.4°$. $c=2.2\%$ in water) are dissolved in 25 parts by volume of methanol and 3.39 parts by weight of β-aminopropionaldehyde-diethyl-acetal are added. The mixture is heated on the boiling water-bath under reflux for three hours. The solvent is then distilled off in vacuo, the final traces being removed together with unreacted material by heating to 90–100° C. and pumping in high vacuum. 6.14 parts by weight remain and analyse correctly for d(+)pantothenic aldehyde-diethyl-acetal. $[\alpha]_D^{23} = +37.7°$. $c=3.2\%$ in ethanol.

8 parts by weight of this optically active pantothenic aldehyde-diethyl-acetal and 4 parts by weight of crystalline oxalic acid are dissolved in 60 parts by volume of water and 7 parts by volume of 30% hydrogen peroxide are added. The mixture remains at room temperature for two days. 5 parts by weight of calcium carbonate powder are added and after the effervescence has subsided, the suspension is shaken for three hours. The suspended solid is removed by filtration and the filtrate evaporated in vacuo, the temperature not exceeding 50° C. The residue is dissolved in water and neutralized against thymol blue with $\frac{1}{10}$ N sodium hydroxide solution. The mixture is again evaporated to dryness under the same conditions and the residue taken up in 20 parts by volume of ethanol. 0.2 part by weight of calcium chloride dissolved in 10 parts by volume of ethanol are then added, and after standing for two hours the mixture is filtered. The filtrate is poured into 500 parts by volume of dry acetone. After drying the precipitated white calcium salt has $[\alpha]_D^{23} = +16.4°$. $c=1\%$ in water. This material consists essentially of calcium d(+)-pantothenate. Its activity exceeds that of the racemic form of the compound described in Example 1.

4. 8 parts by weight of the d(+)-pantothenic aldehyde-diethyl-acetal and 4 parts by weight of crystalline oxalic acid are dissolved in 60 parts by volume of water, and 7 parts by volume of 30% hydrogen peroxide are added. The mixture remains at room temperature for two days. 5 parts by weight of calcium carbonate powder are then added and the suspension is shaken at room temperature for 3½ days. The suspended solid is removed by filtration and the clear filtrate evaporated in vacuo, the temperature not exceeding 50° C. The residue is dissolved in 20 parts by volume of ethanol and the solution poured into 400 parts by volume of dry acetone. The precipitated white solid is removed by filtration and after drying in vacuo has $[\alpha]_D^{23} = +13.9°$. $c=0.72\%$ in water.

We claim:

1. A process for the manufacture of a pantothenic aldehyde acetal which comprises condensing α-hydroxy-β:β-dimethyl-γ-butyrolactone with an acetal of β-aminopropionaldehyde.

2. A process for the manufacture of pantothenic aldehyde-diethyl-acetal which comprises condensing equimolecular quantities of α-hydroxy-β:β-dimethyl-γ-butyrolactone with β-aminopropionaldehyde diethyl-acetal.

3. As a new chemical compound dl-pantothenic aldehyde-diethyl-acetal.

4. As a new chemical compound d(+)-pantothenic aldehyde diethyl-acetal.

FRANZ BERGEL.
ALEXANDER LANG MORRISON.
NATHAN CHADWICK HINDLEY.
ALBERT RONALD MOSS.